Jan. 18, 1949.  L. L. STOTT  2,459,598
BEARING
Filed Oct. 5, 1945

INVENTOR
Louis L. Stott
BY
ATTORNEYS

Patented Jan. 18, 1949

2,459,598

UNITED STATES PATENT OFFICE 2,459,598

BEARING

Louis L. Stott, Reading, Pa., assignor to The Polymer Corporation, Reading, Pa., a corporation of Pennsylvania Application October 5, 1945, Serial No. 620,488

4 Claims. (Cl. 308—238)

This invention relates to a novel form of bearing and to a novel method for making the same. The invention is particularly concerned with a cylindrical shaft bearing comprising a backing member having an interior bearing lining molded from plastic material.

More specifically, the invention contemplates employment of synthetic linear condensation polyamides, most advantageously the polyamides derived as the reaction product of hexamethylenediamine and adipic acid. Such a material is known to the trade as "nylon." It has been recognized that polyamides of the type just mentioned have such frictional characteristics that, for certain bearing purposes, they do not require lubrication. However, polyamides of the type referred to are also characterized by an exceptionally high coefficient of thermal expansion, which has made it difficult to employ the material for many types of bearings, and particularly for continuous cylindrical shaft bearings. This plastic material has a coefficient of thermal expansion which amounts to $10.3 \times 10^{-5}$ per °C., or about ten times that of steel.

The primary object of the present invention is to provide a cylindrical bearing lined with polyamides of the type in question, the bearing being so arranged that the high coefficient of thermal expansion does not produce objectionable results, such as seizing when the bearing tends to become heated in service.

It is a further object of the invention to provide a novel and effective method for forming a cylindrical bearing having a lining molded from polyamides of the type described.

How the foregoing and other objects and advantages are attained will appear more fully from the following description referring to the accompanying drawing in which—

Figure 1:
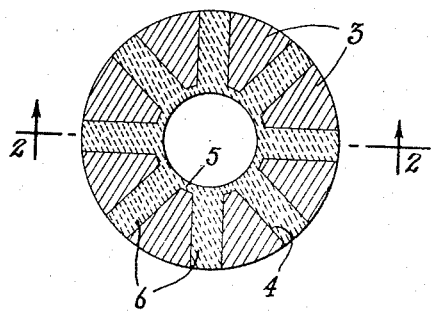
Figure 2:
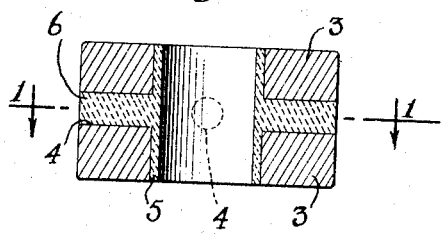

Figure 1 is a sectional view of the bearing of this invention, the view being taken in a plane perpendicular to the axis of the bearing as indicated by the line 1—1 on Figure 2; and Figure 2 is a sectional view taken in an axial plane, as indicated by the line 2—2 on Figure 1.

The bearing comprises a cylindrical bearing backing member 3, preferably in the form of a sleeve and having a multiplicity of radial perforations or apertures 4 which may be of any desired cross-section, for instance, round or slot-like, the inner ends being open through the surface of the internal bore of the sleeve and the outer ends being open through the external surface of the sleeve. The molded bearing lining is indicated by the numeral 5 and from the drawing it will also be seen that the perforations 4 are infilled with plastic material 6 which is molded integrally with the sleeve 5.

The sleeve, together with the integrally formed projections 6 may be molded in a variety of ways, although I prefer injection molding under pressure. In accomplishing this, the invention contemplates utilization of one or more of the perforations 4 for "gating" the plastic material into the bore of the sleeve. Thus the plastic material is introduced radially inwardly into one of the perforations and is caused to flow under pressure into the central bore and radially outwardly through other perforations. Other details of the method and equipment employed in the molding need not be considered in detail herein, although it may be mentioned that synthetic linear condensation polyamides of the character described have a relatively high melting point. For the purpose of molding the plastic, I prefer to heat it to a temperature in a range extending from about 500° F. to about 550° F. The perforated backing member of the bearing is placed in the mold as a removable insert and the mold and insert desirably heated during the molding operation to a minimum of 175° F., although this temperature should preferably be well below about 500° F.

With further reference to the molding, it may be mentioned that a central pin or core member may be inserted in the bore of the backing member during the molding operation, although this is not necessary and, especially with bearings for shafts of small diameter, the central core may be omitted and the entire bore initially filled with the plastic and then subsequently drilled out. Where a core is used, after displacement of the core, the internal surface is advantageously reamed or otherwise machined to the desired diameter.

The backing member of the bearing may be made in any suitable way as, for instance, by cutting off an appropriate length of steel tubing and radially drilling before or after cutting the desired number of perforations in the wall thereof. Alternatively, flat perforated strip metal may be cut to a length corresponding to the circumference of the backing member, and the cut piece then bent to bring its end edges together. If required to meet strength requirements the edges may be welded or otherwise secured together.

Several important characteristics of the invention should here be noted:

In the first place, two factors should be observed in order to take care of the problem arising from the high coefficient of thermal expansion of the plastic material contemplated for use as the bearing lining. One of these important factors is the thickness of the lining. I have found that the thickness should be in the range extending from about 0.008" to about 0.050", preferably from 0.010" to 0.015". On the one hand, if the thickness is less than that just indicated, the problem of manufacture is extremely difficult; on the other hand, if the thickness exceeds the range specified, the extent of thermal expansion impairs the operation of the bearing. The exact thickness to be employed will depend, of course, on a number of considerations including both the diameter and axial dimension of the lining, and also on the bearing tolerance or clearance desired, the loading of the bearing and the type of service in which it is to be used. The range of thickness above indicated, however, comprehends those thicknesses which I have found to be effective for the average type of service with steel shafts of diameter in the range from about 1/8" to about 1".

The second of the two important factors mentioned above is the arrangement of the radial projections 5 of the plastic material which are molded integrally with the bearing lining. These projections should be of appreciable radial extent so that they not only provide effective interlocking with the bearing backing member, but also contribute strength to the lining, which, as already indicated is preferably very thin. Beyond these points, it is of importance that the bores 4 in which the projections 6 are molded extend radially and open outwardly through the outer surface of the bearing backing member. In this way, freedom is provided for thermal expansion of the projections radially outwardly. With this same purpose in view, it is contemplated that in certain types of bearings, for instance where the bearing is adapted to be mounted in an encircling clamp, the outer ends of the projections should be undercut below the outer peripheral surface of the backing member or an aperture provided in the surrounding clamping member in order to ensure freedom for radially outward thermal expansion of the projections.

The bearing backing member is advantageously made of a metal, such as steel, and notwithstanding the fact that the backing member has a relatively low coefficient of thermal expansion in comparison with the unusually high coefficient of the polyamide, the problem of thermal expansion of the plastic is effectively taken care of. For many applications, for instance with SAE 1112 steel shafts at speeds of the order of 550 inches per minute and loads up to 150 lbs. per square inch, I have found that the bearings of the present invention have long life and may be employed without any lubrication whatever, using an initial clearance between shaft and bushing of .005".

I claim:
1. A bearing comprising a sleeve provided with radial perforations opening through both the inner and outer surfaces of the sleeve, and integrally molded plastic material infilling said perforations and lining the interior of the sleeve, the said plastic material comprising a synthetic linear condensation polyamide, and the thickness of the bearing lining being from about .008" to about .050".

2. A bearing comprising a backing member having a cylindrical bore and a molded lining in said bore, the backing member having perforations radiating from said bore, and radiating projections molded in said perforations integrally with said lining to provide for interlocking of the lining with the backing member through an appreciable radial distance, the lining and said radiating projections being formed of a synthetic linear condensation polyamide having a relatively high coefficient of thermal expansion, and the backing member being formed of a metal having a relatively low coefficient thermal expansion with respect to the polyamide and the perforations in the backing member being extended from the bore to open through the external surface of the backing member to provide freedom for radially outward thermal expansion of the molded projections in said perforations.

3. A cylindrical bearing of the sleeve type comprising a sleeve-like backing member, and a molded plastic lining within the sleeve having integrally molded portion interlocking with the sleeve, the said plastic material comprising a synthetic linear condensation polyamide having a high coefficient of thermal expansion, and the thickness of the bearing lining being from about .008" to about .050".

4. A cylindrical bearing comprising a sleeve-like backing member and a molded plastic lining within the sleeve, the said lining comprising a synthetic linear condensation polyamide having a high coefficient of thermal expansion, the thickness of the bearing lining being from about .008" to about .050" and the lining further having a projection molded integrally therewith adapted to interengage with a complementary recess in the sleeve member with freedom for thermal expansion therein.

LOUIS L. STOTT.

REFERENCES CITED

The following references are of record in the file of this patent:

UNITED STATES PATENTS

| Number | Name | Date |
|---|---|---|
| 1,498,578 | Romano | June 24, 1924 |
| 2,246,092 | Gilman | June 17, 1941 |
| 2,276,143 | Bell | Mar. 10, 1942 |
| 2,389,253 | Gatke | Nov. 20, 1945 |